US008747216B2

(12) United States Patent
Stearns et al.

(10) Patent No.: US 8,747,216 B2
(45) Date of Patent: Jun. 10, 2014

(54) SPORTSBOOK ROOM AND METHOD THEREFOR

(75) Inventors: Bill Stearns, Las Vegas, NV (US); Jim Gladney, Las Vegas, NV (US)

(73) Assignee: ISI, Ltd, Las Vegas, NV (US)

( * ) Notice: Subject to any disclaimer, the term of this patent is extended or adjusted under 35 U.S.C. 154(b) by 241 days.

(21) Appl. No.: 12/721,337

(22) Filed: Mar. 10, 2010

(65) Prior Publication Data

US 2011/0223980 A1 Sep. 15, 2011

(51) Int. Cl.
*A63F 9/24* (2006.01)
*A63F 13/00* (2014.01)
*G07F 17/32* (2006.01)

(52) U.S. Cl.
CPC ............ *G07F 17/3216* (2013.01); *G07F 17/32* (2013.01); *G07F 17/3288* (2013.01)
USPC ........ 463/25; 463/6; 463/16; 463/28; 463/29; 463/40; 463/46

(58) Field of Classification Search
None
See application file for complete search history.

(56) References Cited

U.S. PATENT DOCUMENTS

| | | | | | |
|---|---|---|---|---|---|
| 4,760,527 | A | * | 7/1988 | Sidley | 463/13 |
| 4,805,907 | A | * | 2/1989 | Hagiwara | 463/26 |
| 4,856,787 | A | * | 8/1989 | Itkis | 273/237 |
| 5,672,106 | A | * | 9/1997 | Orford et al. | 463/28 |
| 5,830,068 | A | * | 11/1998 | Brenner et al. | 463/42 |
| 6,077,162 | A | * | 6/2000 | Weiss | 463/26 |
| D460,496 | S | * | 7/2002 | Cole | D21/369 |
| 6,544,121 | B2 | * | 4/2003 | DeWeese et al. | 463/30 |
| 6,560,093 | B1 | * | 5/2003 | McLeod et al. | 361/679.6 |
| 6,652,378 | B2 | * | 11/2003 | Cannon et al. | 463/20 |
| 6,680,714 | B2 | * | 1/2004 | Wilmore | 345/1.1 |
| D498,080 | S | * | 11/2004 | Bosman | D6/421 |
| 6,860,810 | B2 | * | 3/2005 | Cannon et al. | 463/20 |
| 6,942,574 | B1 | * | 9/2005 | LeMay et al. | 463/41 |
| 6,980,259 | B2 | * | 12/2005 | Strollo et al. | 348/836 |
| 6,989,800 | B2 | * | 1/2006 | McLaughlin | 345/1.3 |
| D523,093 | S | * | 6/2006 | Kaminkow et al. | D21/369 |
| D529,101 | S | * | 9/2006 | Kaminkow et al. | D21/385 |
| D554,710 | S | * | 11/2007 | Malone et al. | D21/370 |
| D555,209 | S | * | 11/2007 | Malone et al. | D21/370 |
| 7,311,598 | B2 | * | 12/2007 | Kaminkow et al. | 463/16 |
| D567,233 | S | * | 4/2008 | Malone et al. | D14/307 |
| 7,601,063 | B2 | * | 10/2009 | Okada | 463/20 |
| 7,607,975 | B2 | * | 10/2009 | Sato et al. | 463/6 |
| 7,618,317 | B2 | * | 11/2009 | Jackson | 463/24 |
| 7,828,652 | B2 | * | 11/2010 | Nguyen et al. | 463/29 |
| D641,427 | S | * | 7/2011 | Lin | D21/325 |
| 8,052,508 | B2 | * | 11/2011 | Okada | 463/6 |
| 8,052,509 | B2 | * | 11/2011 | Okada | 463/6 |
| 8,052,510 | B2 | * | 11/2011 | Okada | 463/6 |
| 8,057,303 | B2 | * | 11/2011 | Rasmussen et al. | 463/29 |

(Continued)

OTHER PUBLICATIONS

"Top 10 Las Vegas Sportsbooks", by Gary Trask, Sep. 1, 2008.*

(Continued)

*Primary Examiner* — Steven J Hylinski

(74) *Attorney, Agent, or Firm* — Weiss & Moy, P.C.; Jeffrey D. Moy

(57) ABSTRACT

An improved sportsbook room is disclosed. The sportsbook room allows an individual to place wagers on the sports competitions shown in the sportsbook room from a gaming terminal in his/her carrel and to also play other casino games on the same gaming terminal.

19 Claims, 15 Drawing Sheets

(56) References Cited

U.S. PATENT DOCUMENTS

| | | | | |
|---|---|---|---|---|
| 8,075,378 | B2 * | 12/2011 | Okada | 463/6 |
| 8,087,994 | B2 * | 1/2012 | Englman et al. | 463/21 |
| 8,109,821 | B2 * | 2/2012 | Kovacs et al. | 463/16 |
| 8,414,372 | B2 * | 4/2013 | Cannon et al. | 463/16 |
| 2002/0177483 | A1 * | 11/2002 | Cannon | 463/42 |
| 2004/0009812 | A1 * | 1/2004 | Scott et al. | 463/28 |
| 2004/0106446 | A1 * | 6/2004 | Cannon et al. | 463/16 |
| 2004/0198479 | A1 * | 10/2004 | Martinek et al. | 463/1 |
| 2004/0220862 | A1 * | 11/2004 | Jackson | 705/26 |
| 2005/0215326 | A1 * | 9/2005 | Iosilevsky | 463/46 |
| 2005/0282618 | A1 * | 12/2005 | O'Halloran | 463/20 |
| 2006/0084483 | A1 * | 4/2006 | Shin | 463/6 |
| 2006/0105840 | A1 * | 5/2006 | Graeve | 463/42 |
| 2006/0160615 | A1 * | 7/2006 | Boyd | 463/30 |
| 2007/0060382 | A1 * | 3/2007 | Ando | 463/43 |
| 2007/0111774 | A1 * | 5/2007 | Okada | 463/16 |
| 2007/0149291 | A1 * | 6/2007 | Mitchell | 463/46 |
| 2007/0265069 | A1 * | 11/2007 | Okada | 463/31 |
| 2008/0067312 | A1 * | 3/2008 | Allen et al. | 248/317 |
| 2008/0070663 | A1 * | 3/2008 | Losilevsky | 463/13 |
| 2008/0102916 | A1 * | 5/2008 | Kovacs et al. | 463/16 |
| 2008/0176626 | A1 * | 7/2008 | Okada | 463/19 |
| 2008/0176644 | A1 * | 7/2008 | Okada | 463/25 |
| 2008/0176651 | A1 * | 7/2008 | Okada | 463/31 |
| 2008/0176657 | A1 * | 7/2008 | Okada | 463/42 |
| 2008/0178774 | A1 * | 7/2008 | Saccani | 108/50.01 |
| 2008/0254862 | A1 * | 10/2008 | Mattice et al. | 463/25 |
| 2008/0254881 | A1 * | 10/2008 | Lutnick et al. | 463/31 |
| 2009/0163269 | A1 * | 6/2009 | Yamagishi | 463/25 |
| 2009/0233665 | A1 * | 9/2009 | Okada | 463/6 |
| 2009/0233671 | A1 * | 9/2009 | Tsukahara | 463/6 |

OTHER PUBLICATIONS

"Our Best Picks—Best Sportsbooks in Las Vegas", from the Betting Advice Guide from Cappers Picks. Updated 2008. Source: http://www.capperspicks.com/sportsbooks/best-vegas/.*

"Top-10 Las Vegas sportsbooks", by Gary Trask, Sep. 1, 2008. Source: http://garytrask.casinocitytimes.com/article/top-10-las-vegas-sportsbooks-43497.*

"Casino Beat: Casino Football Contests", by Eric James Miller, Sep. 3, 2009. Source http://living-las-vegas.com/2009/09/casino-football-contests/.*

* cited by examiner

SPORTSBOOK ROOM AND METHOD THEREFOR

FIELD OF THE INVENTION

This invention relates generally to gambling and, more specifically, to an improved sportsbook room.

BACKGROUND OF THE INVENTION

A sportsbook is a place where a gambler may bet on various sports competitions like football, basketball, baseball, hockey, soccer, horse racing, dog racing, boxing, golf, and mixed martial arts. The method of betting depends upon the sport and the type of game.

A Nevada casino sportsbook is typically a large room with numerous big screen televisions on the walls. The sportsbook room will often have carrels where an individual may sit and watch a sports competition of his/her choice on a smaller television. Whenever an individual wishes to place a wager, he/she will get up from his/her seat in the sportsbook room and will go to a nearby betting window to place the wager.

The present invention is directed to sportsbook room that allows an individual to place wagers from a gaming terminal in his/her carrel and to also play other casino games on the same gaming terminal.

SUMMARY OF THE INVENTION

In accordance with one embodiment of the present invention, a sportsbook room is disclosed. The sportsbook room comprises a plurality of television screens on at least one wall of a room, each television screen showing a live sports competition, a plurality of carrels located in an area of the room from where the television screens may be viewed, and a plurality of gaming terminals, each gaming terminal located in one of the carrels, wherein each gaming terminal is used by an individual for placing at least one wager on at least one sports competition shown on the plurality of television screens.

In accordance with another embodiment of the present invention, a sportsbook room is disclosed. The sportsbook room comprises a plurality of television screens on three adjacent walls of a casino room, a plurality of carrels located in an area of the room from where the television screens may be viewed and around which the television screens form a semi-circle, and a plurality of gaming terminals, each gaming terminal located in one of the carrels, wherein each gaming terminal is used by an individual for at least one of placing wagers on sports competitions, watching an sports competition, playing casino games, viewing scores of sports competitions, viewing weather, viewing betting odds on various sports competitions, viewing sports statistics, viewing house rules of a casino hosting the sportsbook, viewing instructions on placing wagers, or any combination thereof.

In accordance with another embodiment of the present invention, a method of running a sportsbook is disclosed. The method comprises the steps of providing a sportsbook room in a casino comprising: a plurality of television screens on at least one wall of a room, each television screen showing a live sports competition, a plurality of carrels located in an area of the room from where the television screens may be viewed, a plurality of interactive touch screen gaming terminals, each gaming terminal located in one of the carrels, placing wagers by individuals in the sportsbook room using the gaming terminals in the carrels, and accepting the wagers by the casino placed by the individuals through the gaming terminals.

The foregoing and other objects, features, and advantages of the invention will be apparent from the following, more particular description of the preferred embodiments of the invention, as illustrated in the accompanying drawings.

BRIEF DESCRIPTION OF THE DRAWINGS

FIG. 6 is another sample screen of a gaming terminal used with the sportsbook room of FIG. 1. A player will use this screen to choose a type of wager when the individual has already chosen a specific sports competition to place a wager on.

DETAILED DESCRIPTION OF THE PREFERRED EMBODIMENTS

Figure 1:
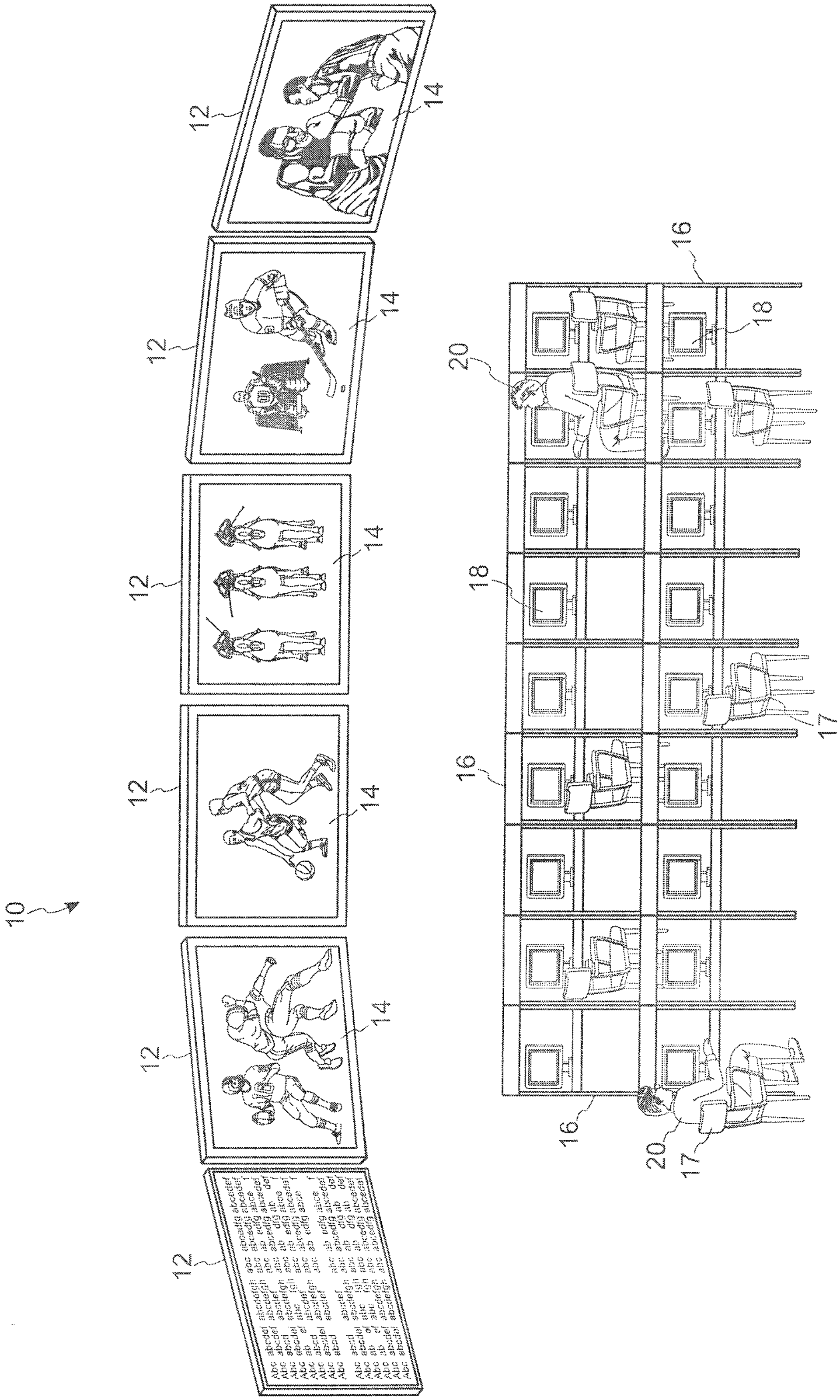
FIG. 1 is a perspective view of a sportsbook room in accordance with the present invention. The sportsbook room is shown with big screen televisions on display in a semi-circle configuration and with a plurality of carrels positioned in the center of the semi-circle of televisions. Each carrel is shown equipped with a gaming terminal.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

FIGS. 1-15 disclose a sportsbook room, hereinafter sportsbook room 10, which would be used in a casino. The sportsbook room 10 will have several television screens 12 mounted on the walls for showing live sports competitions 14. The sports competitions 14 include, but are not limited to football, basketball, baseball, hockey, soccer, horse racing, dog racing, boxing, golf, and mixed martial arts. The sportsbook room 10 will also have carrels 16 located in an area of the sportsbook room 10 from where the television screens 12 may be viewed. Each carrel 16 will be equipped with a gaming terminal 18 on which individuals 20 may place wagers 24 on the sports competition(s) 14 of his/her choosing.

Referring to FIG. 1, the television screens 12 are positioned along at least one wall of the sportsbook room 10. It should be clearly understood that substantial benefit may be derived from the television screens 12 being directly mounted to the wall or from being on stands positioned in front of the wall. In one embodiment of the invention, the television screens 12 will be positioned or mounted along three adjacent walls so that they form a semi-circle configuration.

The sportsbook room 10 will have seats and tables for individuals 20 to sit and watch the live sports competitions 14 shown on the television screens 12. The sportsbook room 10 will also have carrels 16 located in an area of the sportsbook room 10 from where the television screens 12 may be viewed. In the embodiment wherein the television screens 12 form a semi-circle configuration, the carrels 16 will preferably be in a central position relative to the semi-circle. Each carrel 16 will have a seat 17 and a gaming terminal 18 for an individual 20 to use.

Figure 2:
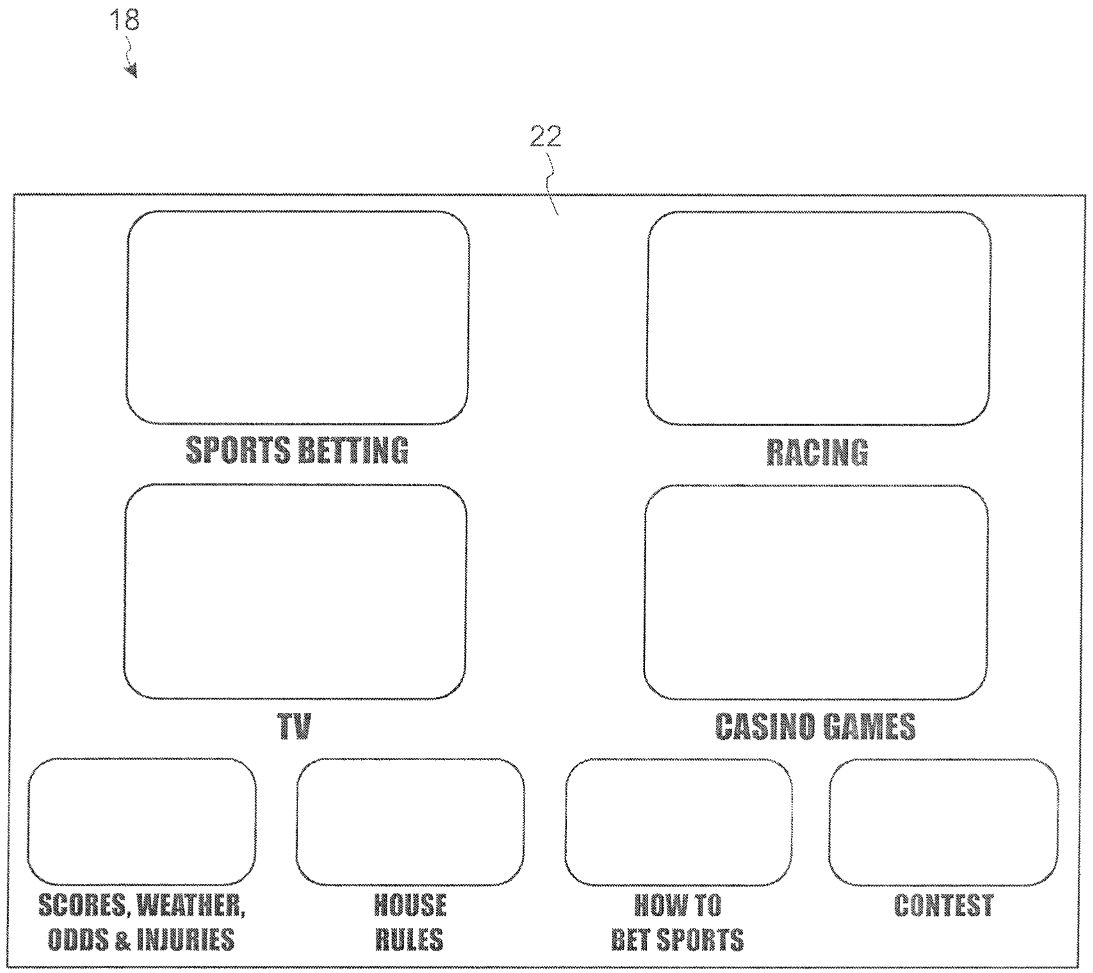
FIG. 2 is a sample screen of a gaming terminal used with the sportsbook room of FIG. 1. A player will use this screen to choose from the various functions of the gaming terminal. The sample screen shows that the gaming terminal may be used for placing wagers on sports competitions, playing casino games, watching a sports competition of the individual's choosing, checking sports scores, checking sports statistics, checking weather, reviewing the house rules, and reading instructions on how to place a sports wager.
Figure 3:
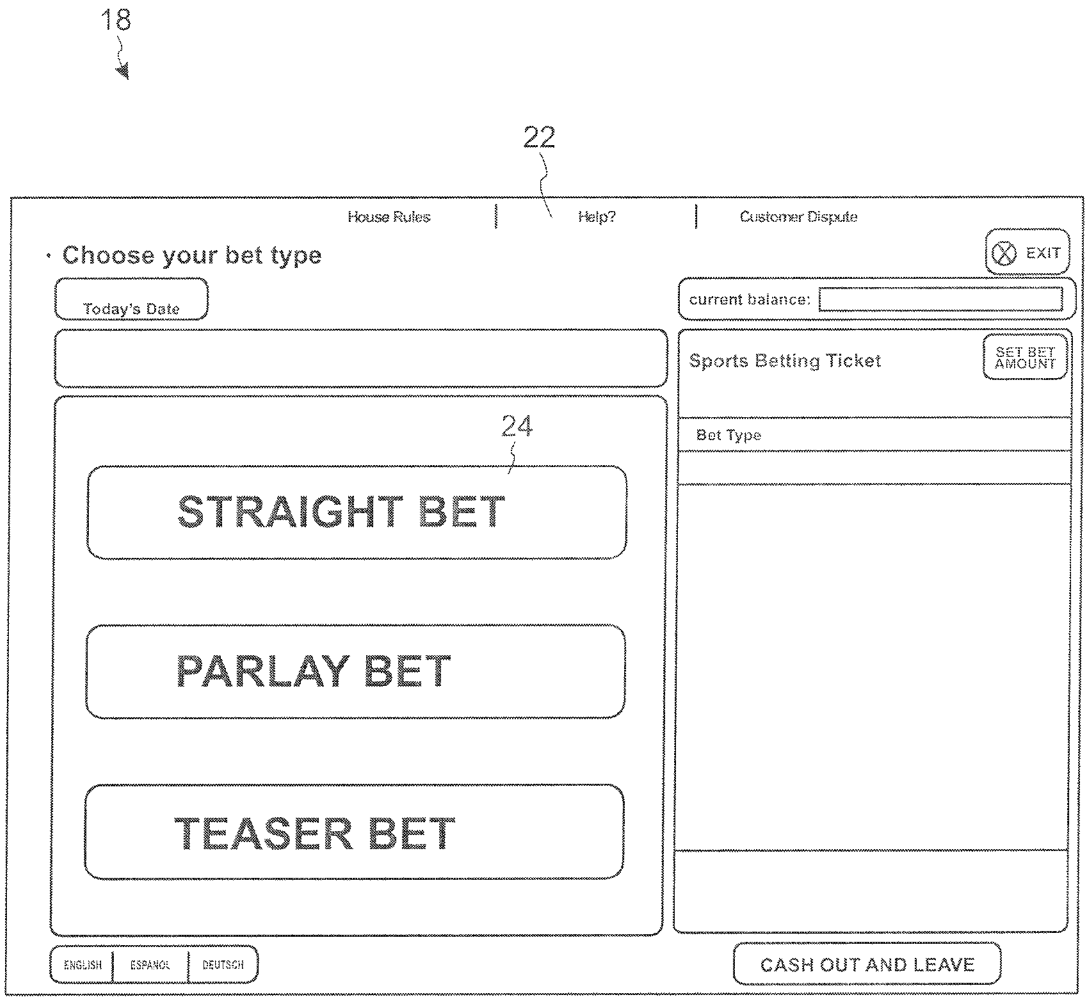
FIG. 3 is another sample screen of a gaming terminal used with the sportsbook room of FIG. 1. A player will use this screen to choose a type of wager to place.
Figure 4:
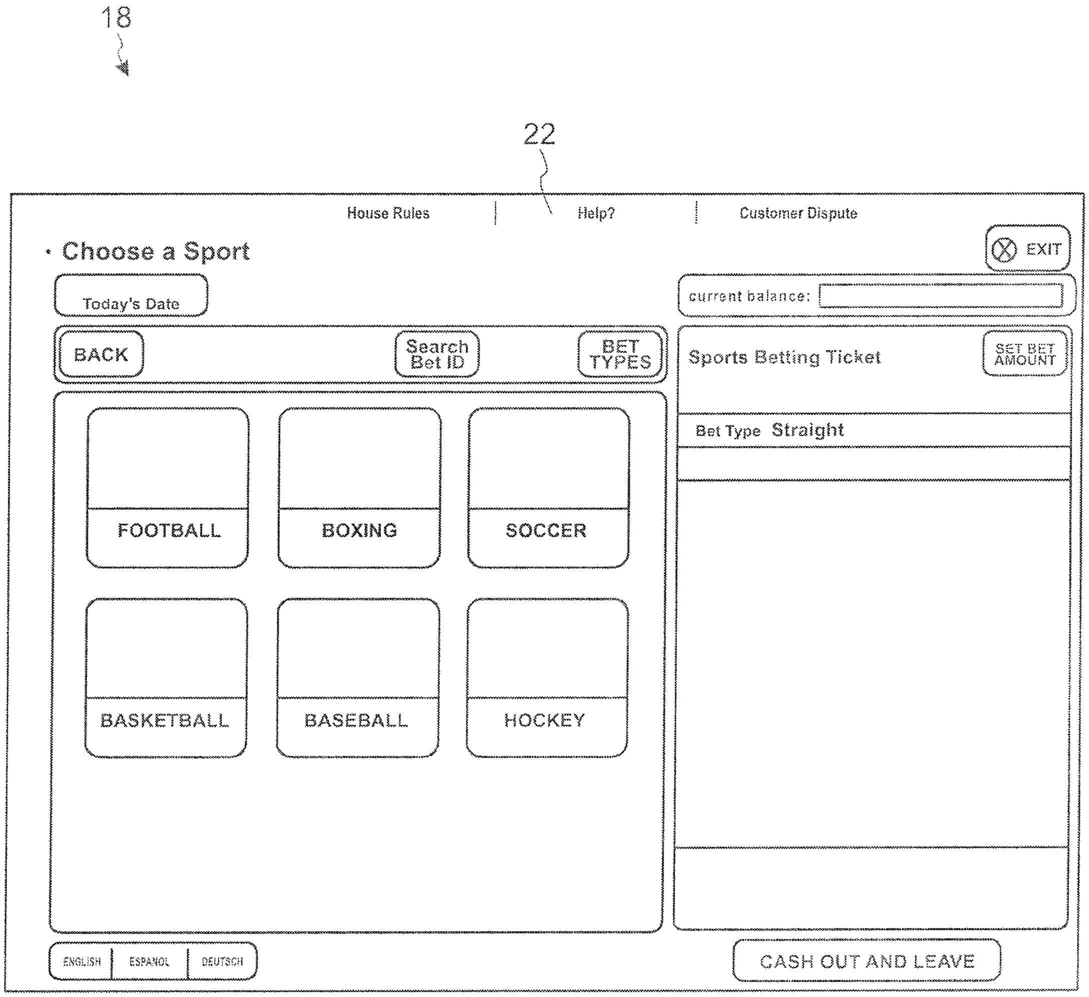
FIG. 4 is another sample screen of a gaming terminal used with the sportsbook room of FIG. 1. A player will use this screen to choose a type of sports competition on which to place a wager.
Figure 5:
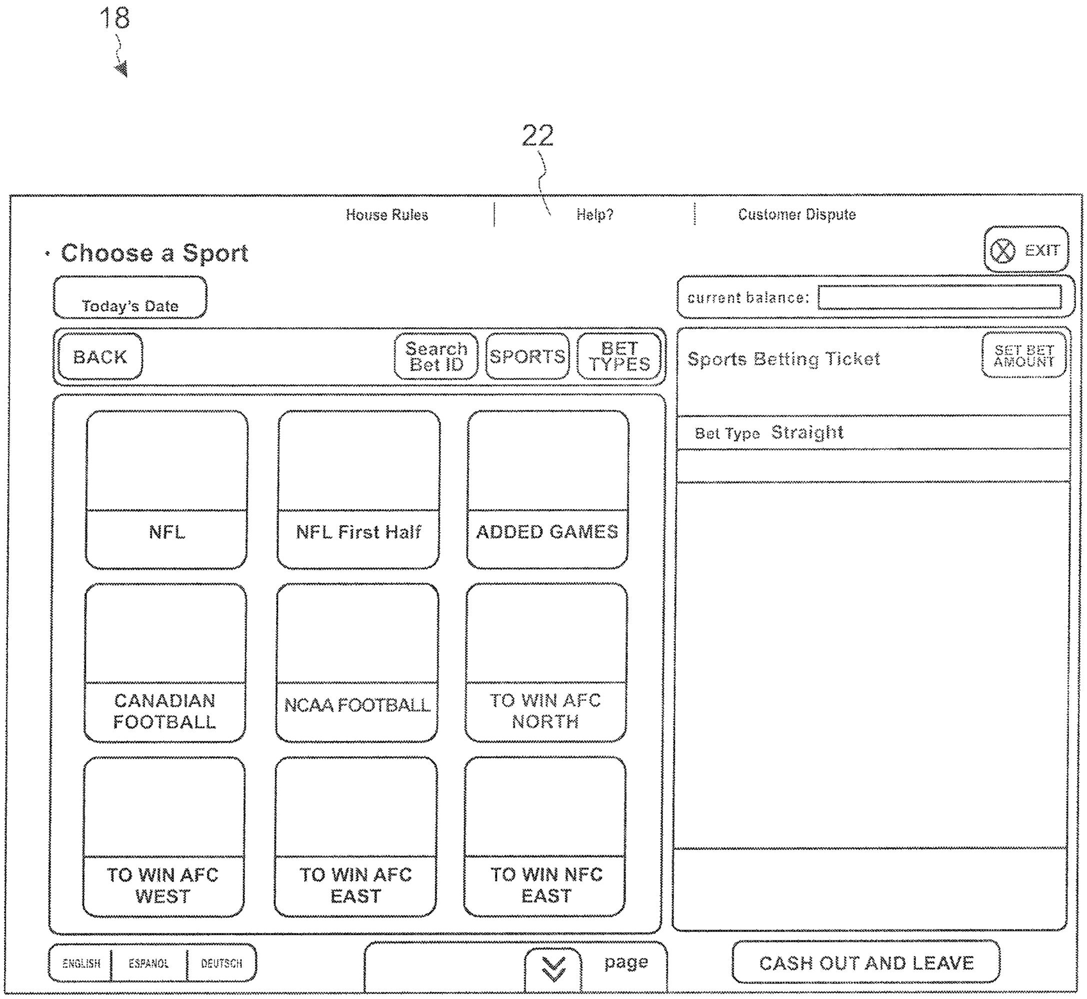
FIG. 5 is another sample screen of a gaming terminal used with the sportsbook room of FIG. 1. A player will use this screen to choose a type of wager to place when the chosen sport is football.
Figure 6:
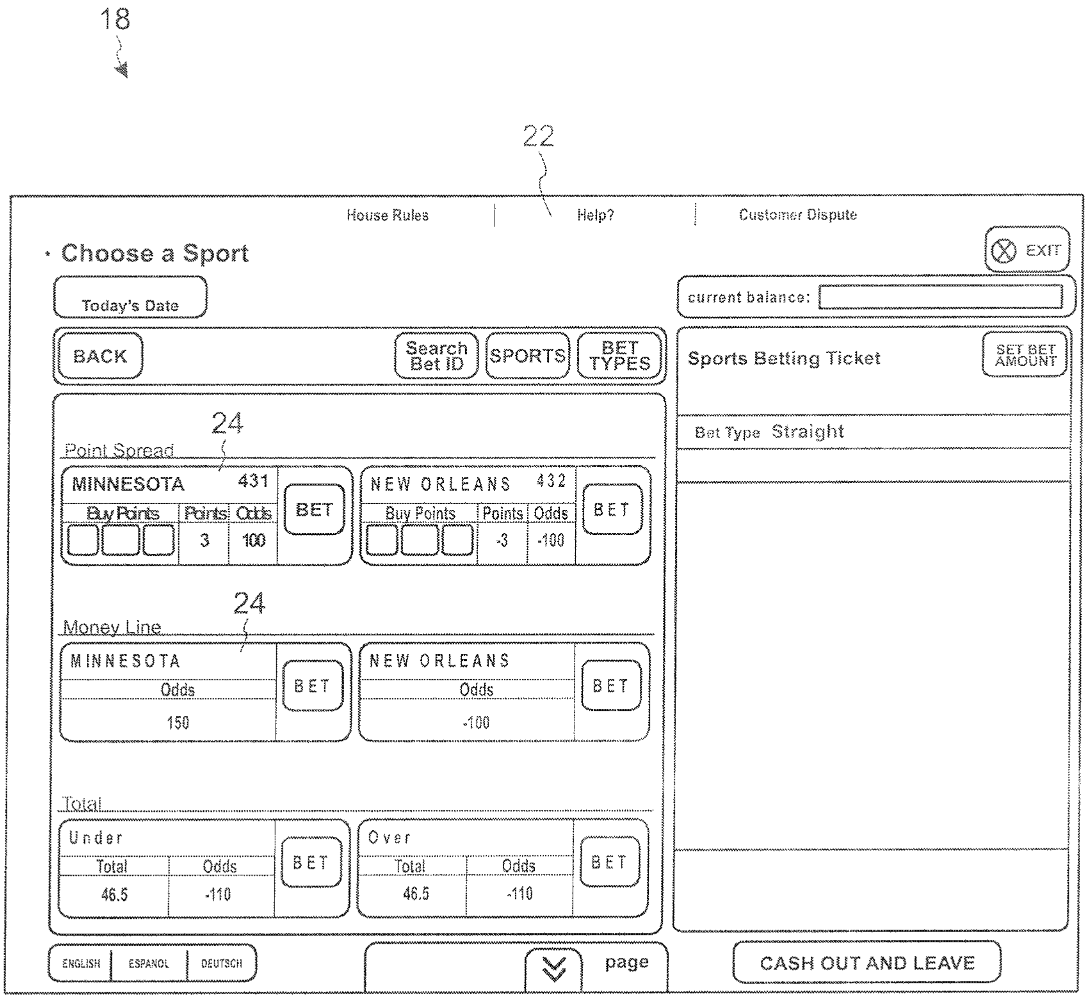
Figure 7:
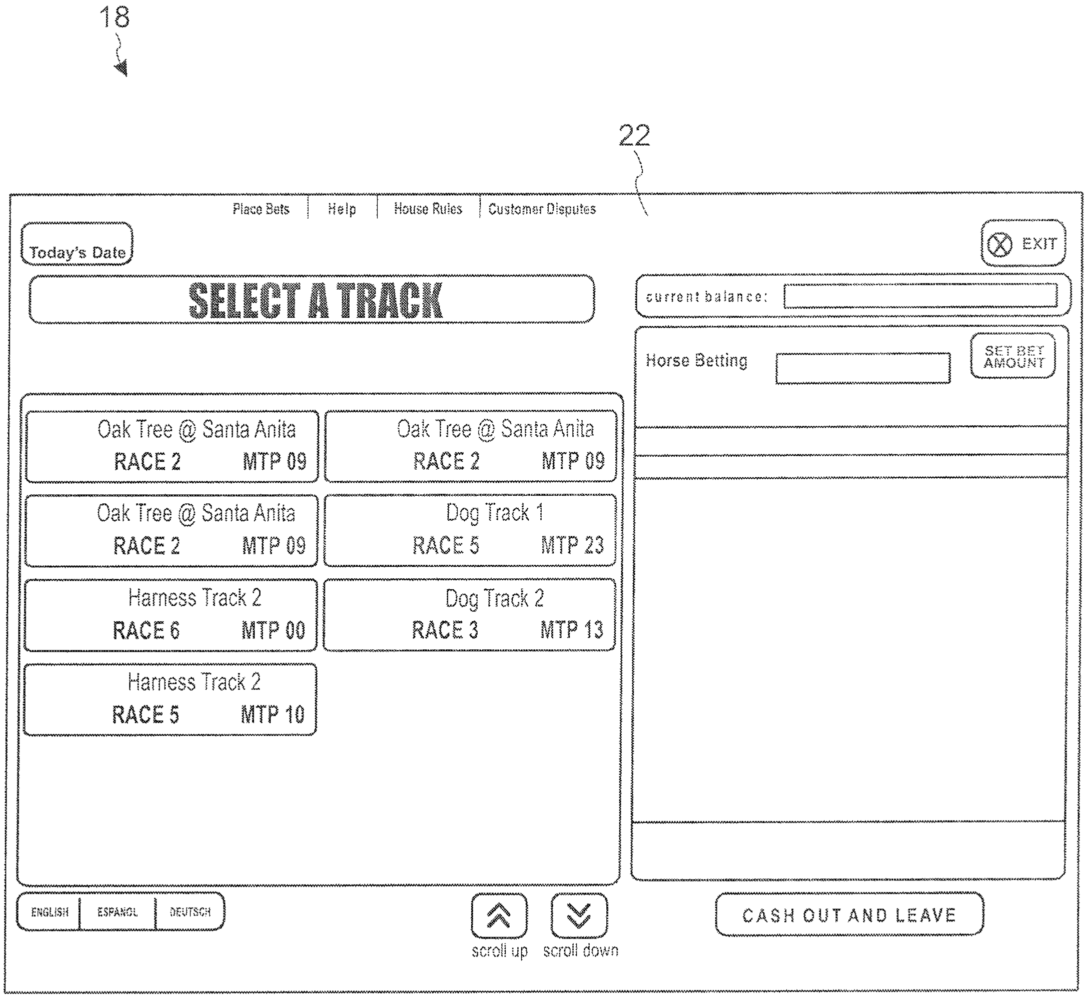
FIG. 7 is another sample screen of a gaming terminal used with the sportsbook room of FIG. 1. A player will use this screen to choose a type of wager to place when the chosen sport is racing.
Figure 8:
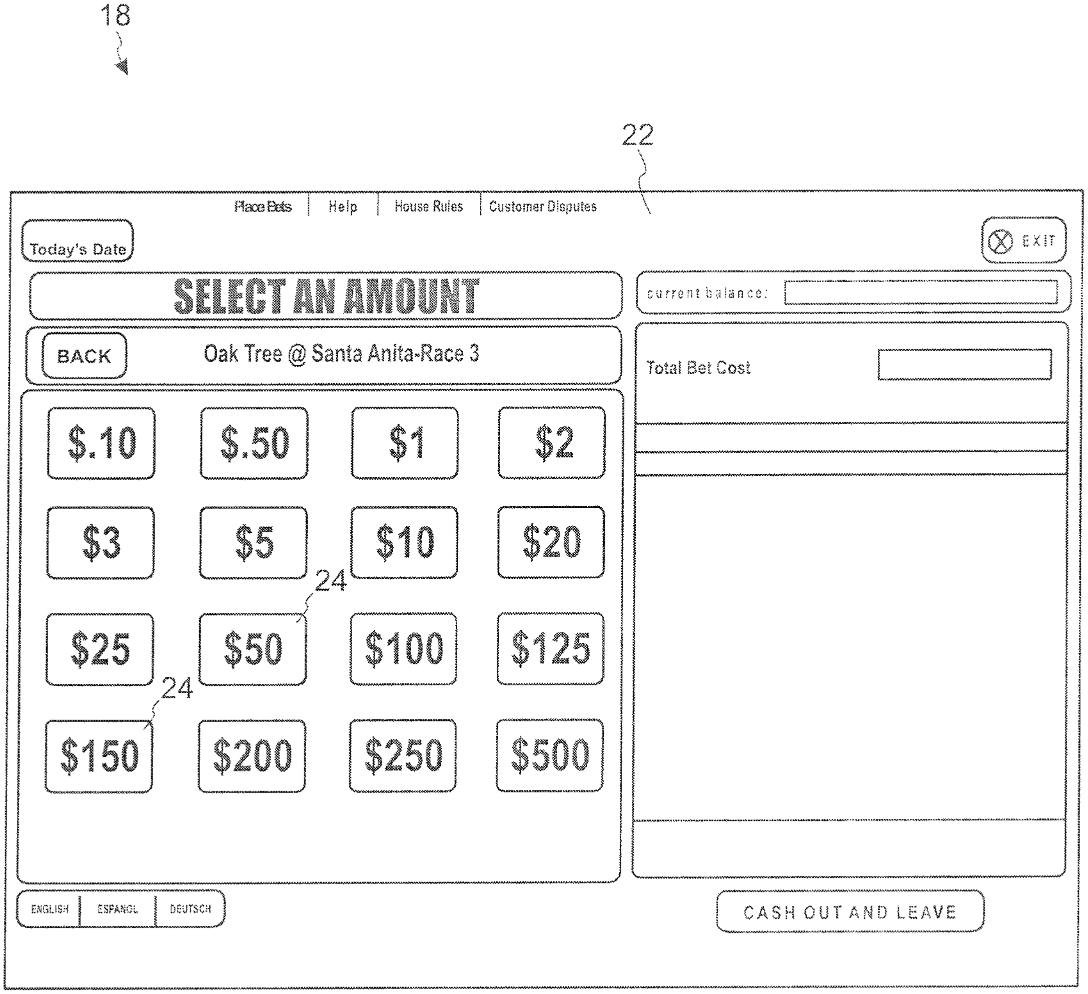
FIG. 8 is another sample screen of a gaming terminal used with the sportsbook room of FIG. 1. A player will use this screen to choose an amount of his/her wager when the chosen sport is racing.
Figure 9:
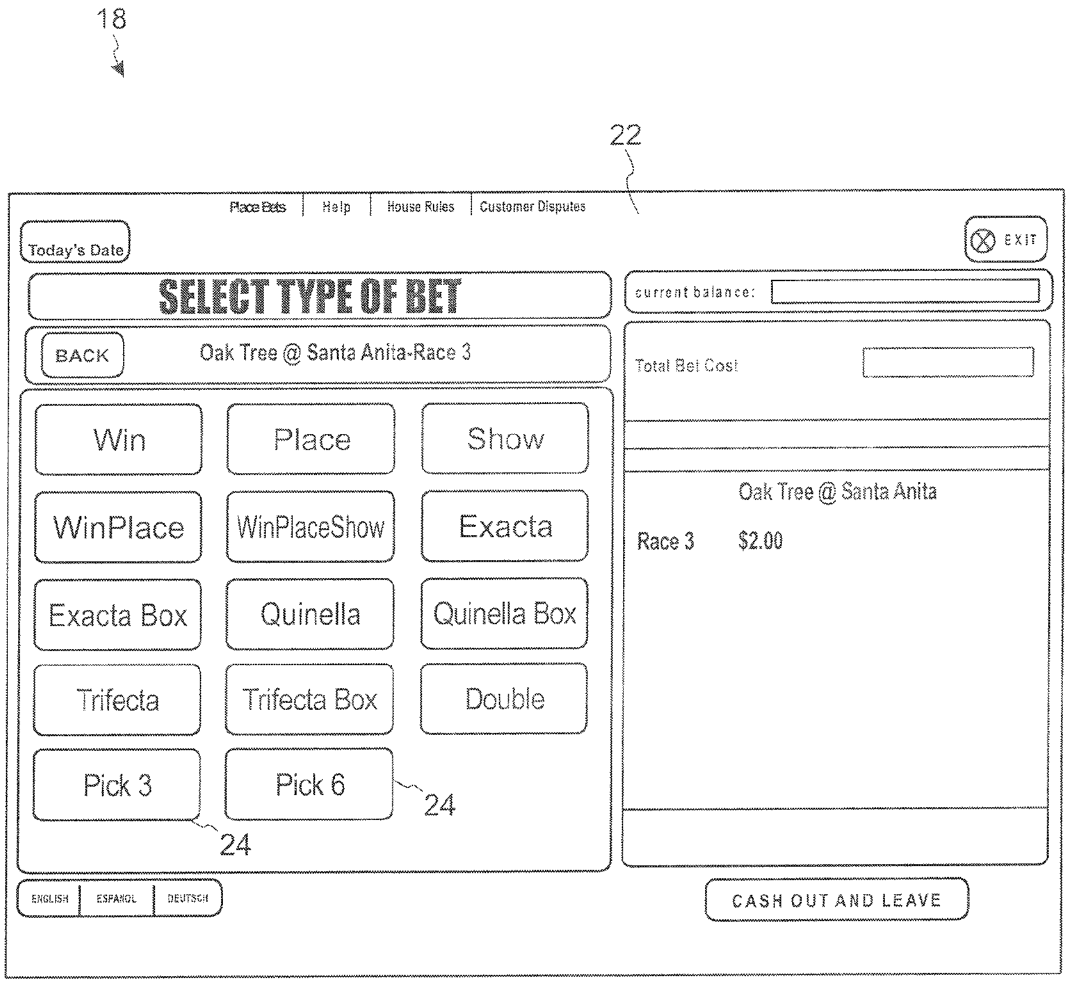
FIG. 9 is another sample screen of a gaming terminal used with the sportsbook room of FIG. 1. A player will use this screen to choose a type of wager when the chosen sport is racing.
Figure 10:
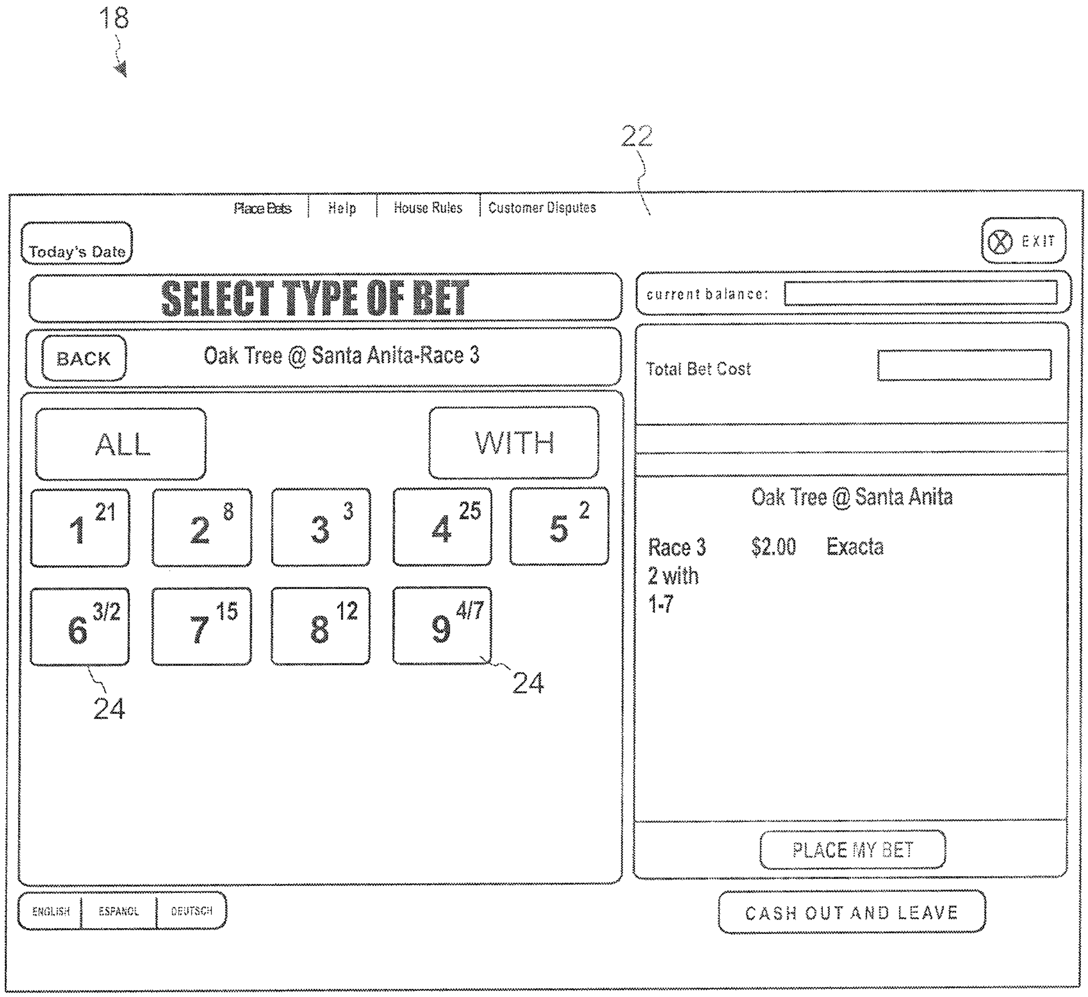
FIG. 10 is another sample screen of a gaming terminal used with the sportsbook room of FIG. 1. A player will use this screen to choose a type of wager when the chosen sport is racing.
Figure 11:
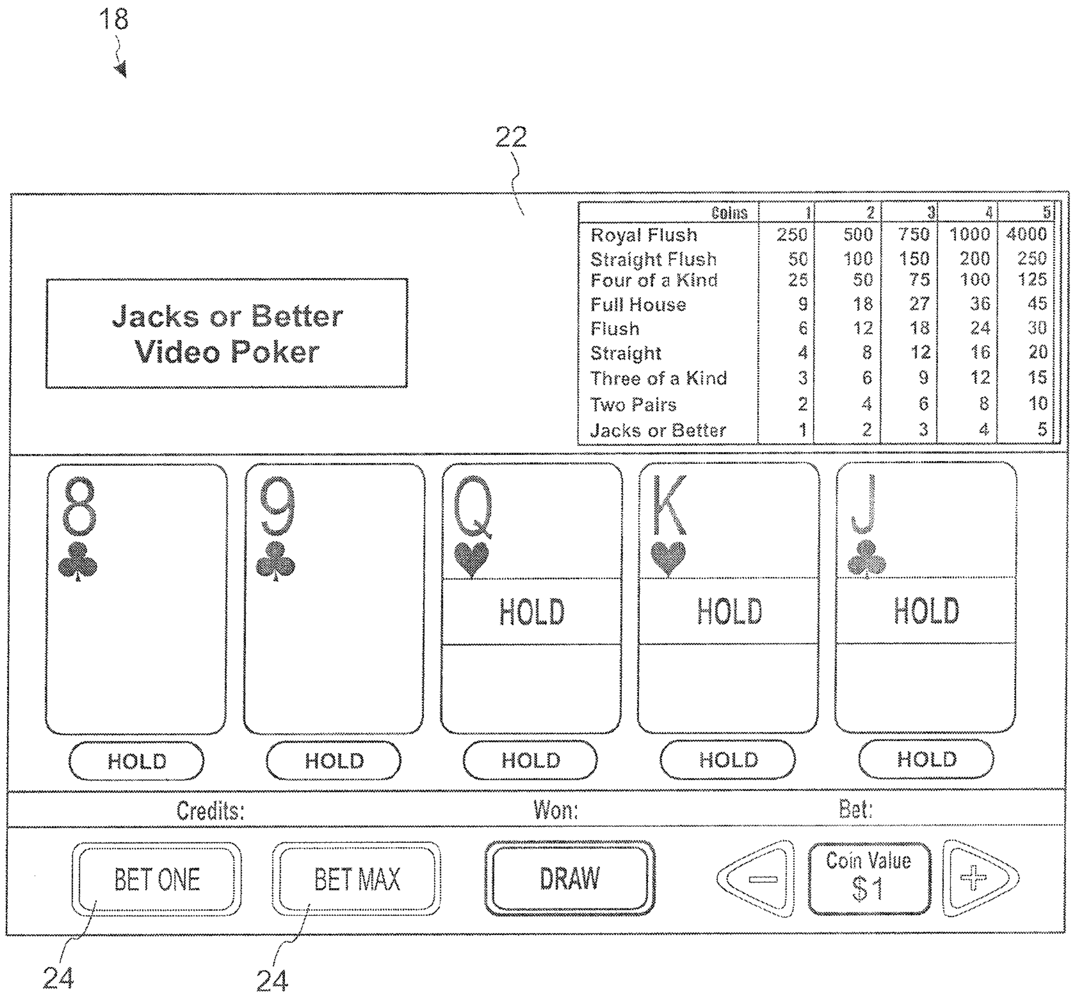
FIG. 11 is another sample screen of a gaming terminal used with the sportsbook room of FIG. 1. A player will use this screen when the chosen casino game is poker.
Figure 12:
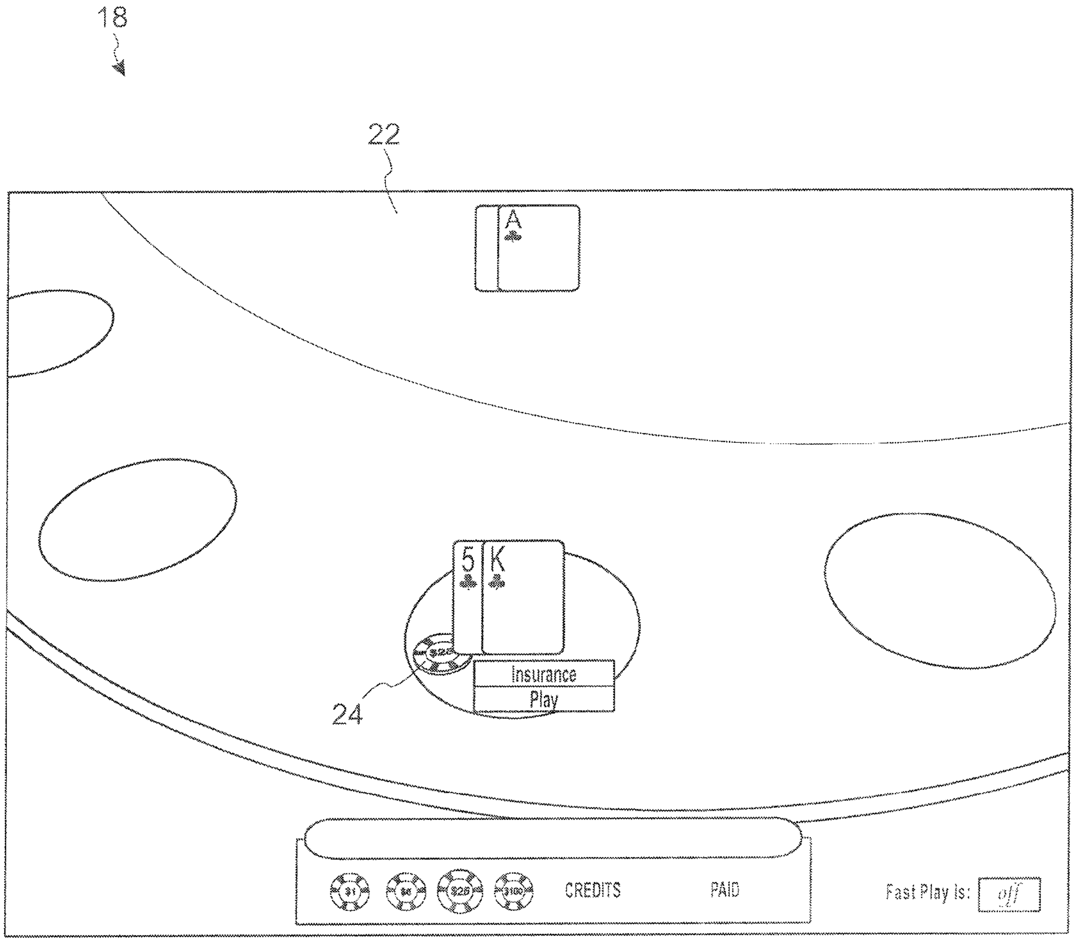
FIG. 12 is another sample screen of a gaming terminal used with the sportsbook room of FIG. 1. A player will use this screen when the chosen casino game is blackjack.
Figure 13:
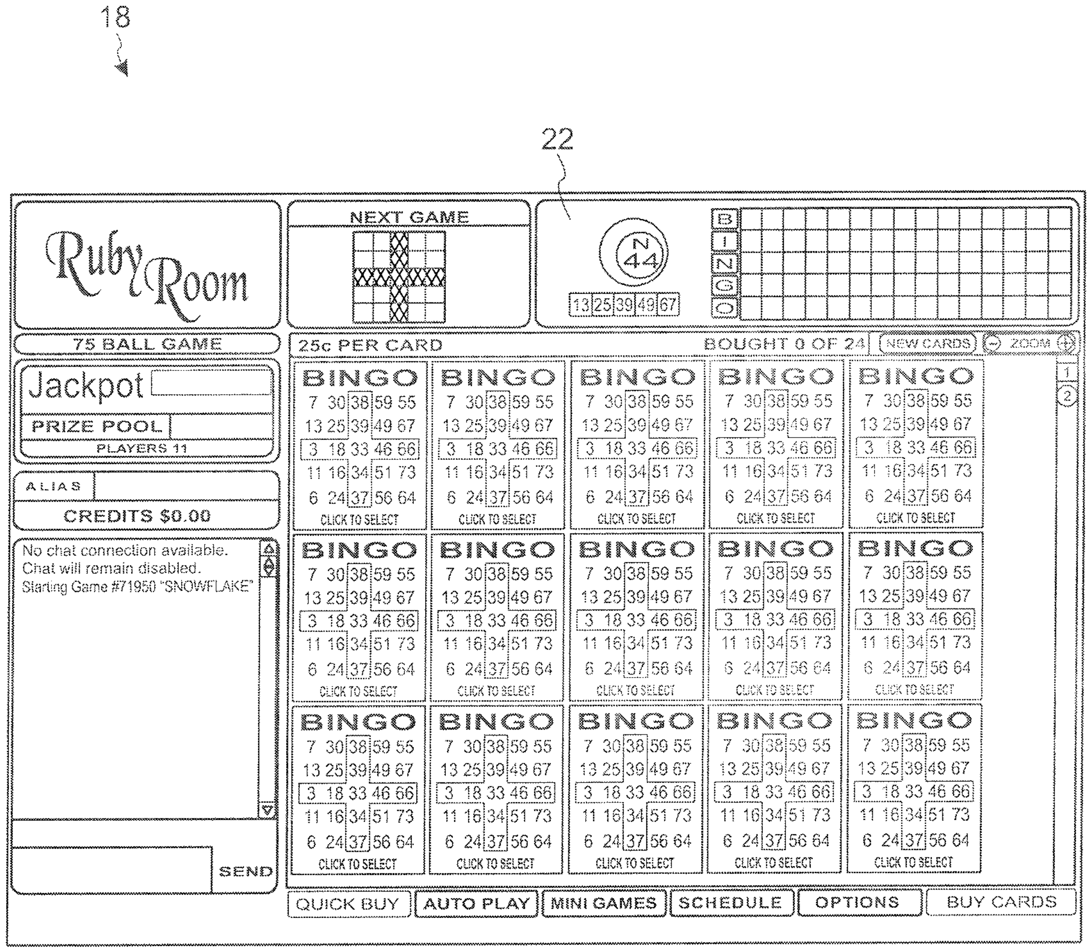
FIG. 13 is another sample screen of a gaming terminal used with the sportsbook room of FIG. 1. A player will use this screen when the chosen casino game is bingo.
Figure 14:
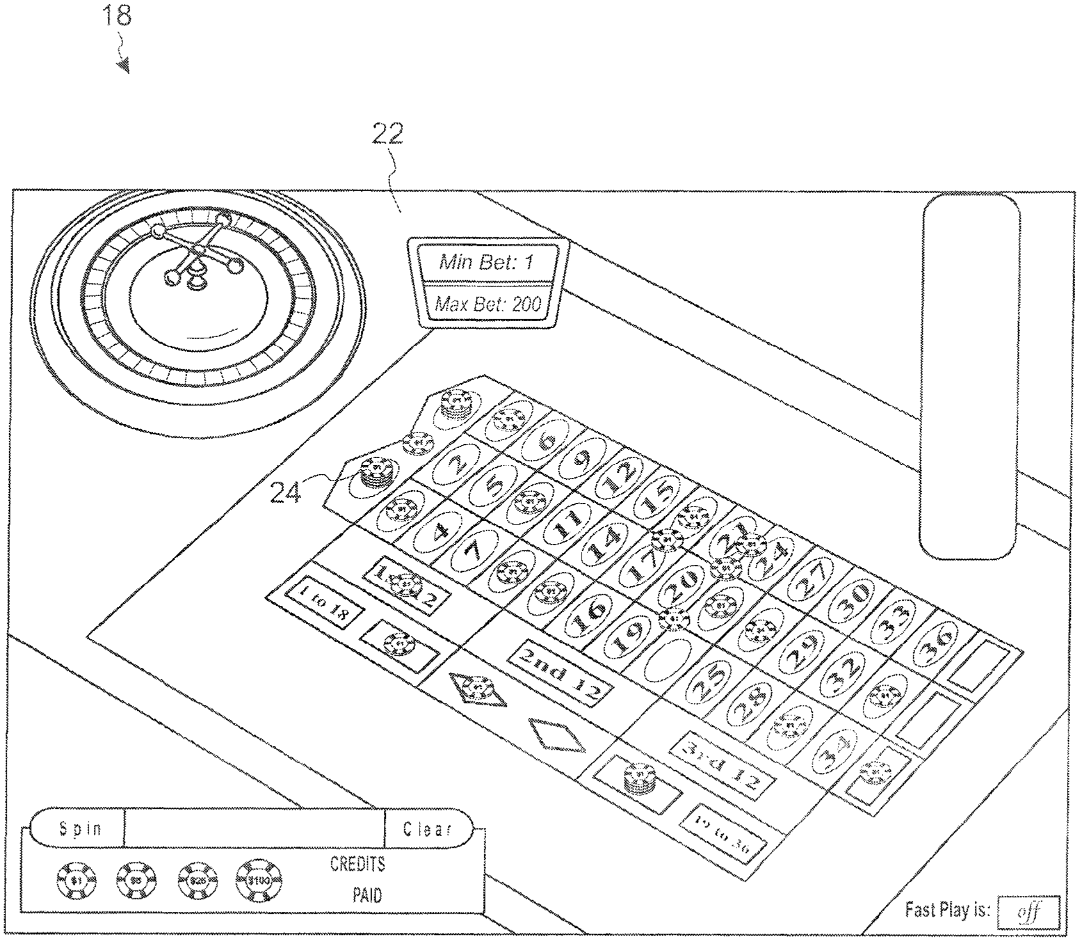
FIG. 14 is another sample screen of a gaming terminal used with the sportsbook room of FIG. 1. A player will use this screen when the chosen casino game is roulette.

Referring to FIG. 2, each gaming terminal 18 will have an interactive touch screen 22. The interactive touch screen 22 will allow an individual 20 to choose among the various functions of the gaming terminal 18. Each gaming terminal 18 may be used for betting on sports competitions 14, watching a sports competition 14 of the individual's 20 choosing, playing casino games, viewing scores of sports competitions 14, viewing weather, viewing betting odds on various sports competitions 14, viewing sports statistics, viewing house rules of the casino hosting the sportsbook room 10, viewing instructions on placing bets, or any combination thereof. In order to choose which function to perform on the gaming terminal 18, the individual 20 will simply press the appropriate area on the interactive touch screen 22.

FIGS. 3-10 are sample screens that would be seen on a gaming terminal 18. The screens will allow an individual 20 to choose the type of sports competition 14 to place a wager 24 on (see FIG. 4), what type of wager 24 to place (see FIGS. 3, 5, 6, 7, 9, and 10), and the amount of the wager 24. At any point the individual 20 will be able to cash out and end his/her session on the gaming terminal 18.

Figure 15:
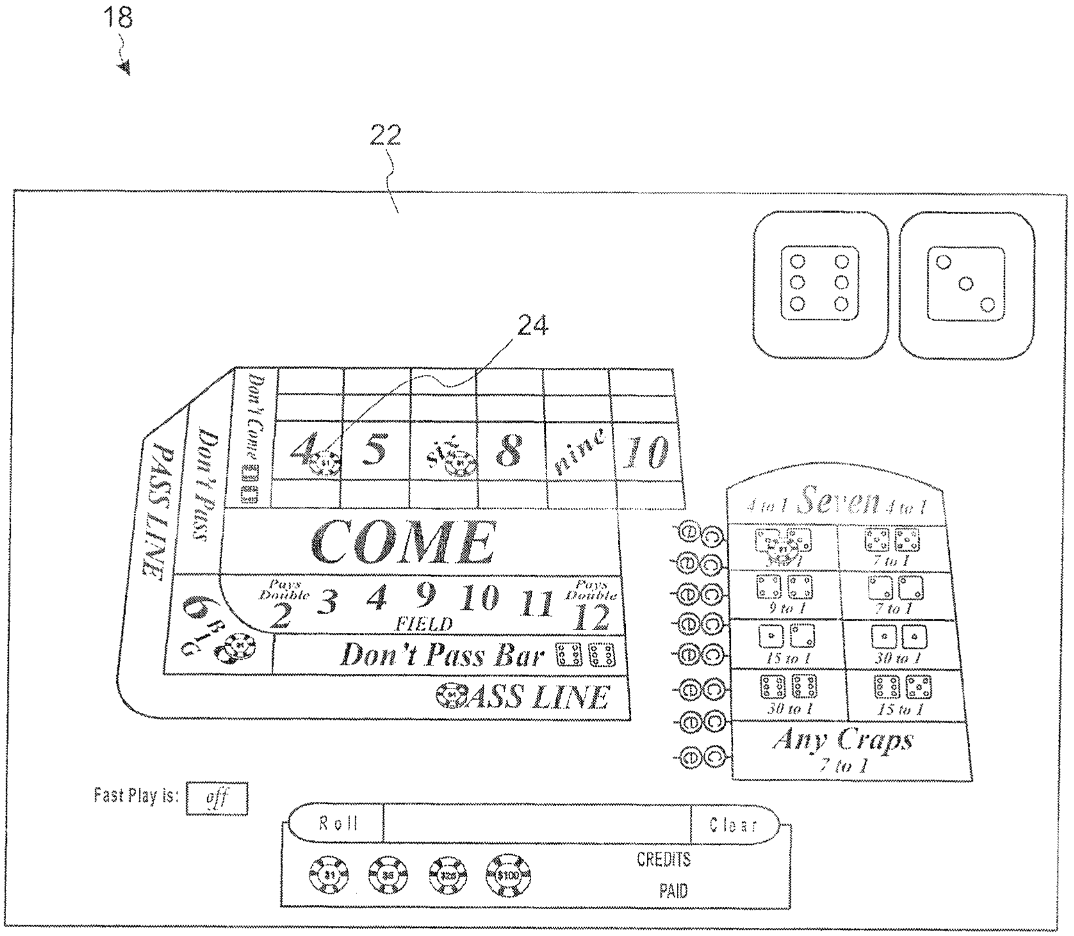
FIG. 15 is another sample screen of a gaming terminal used with the sportsbook room of FIG. 1. A player will use this screen when the chosen casino game is craps.

As shown in FIGS. 11-15, the gaming terminals 18 may also be used to play other casino games such as poker (see FIG. 11), blackjack (see FIG. 12), bingo (see FIG. 13), roulette (see FIG. 14), and craps (see FIG. 15). While these casino games are shown in the figures, it should be clearly understood that other types of casino games may be used.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A sportsbook room comprising:

a plurality of television screens positioned along at least one wall of a room, each television screen showing a live sports competition, each sports competition being a live event undetermined by a computer system;

a plurality of carrels located in an area of the room from where the television screens may be viewed; and a plurality of gaming terminals, each gaming terminal located in one of the carrels;

wherein each gaming terminal includes at least one input device and at least one display device that are configured to operate with the gaming terminal to:

(a) enable a player to place at least one wager on at least one sports competition shown on the plurality of television screens; and (b) enable the player to play at least one casino game, wherein the casino game is a type of game different from a live sports competition.

2. The sportsbook room of claim 1 wherein the plurality of television screens are mounted on three adjacent walls of the room forming a semi-circle and partially surrounding the plurality of carrels.

3. The sportsbook room of claim 1 wherein the sports competitions shown on the television screens are at least one of football, basketball, baseball, hockey, soccer, horse racing, dog racing, boxing, golf, and mixed martial arts.

4. The sportsbook room of claim 1 wherein each gaming terminal has an interactive touch screen.

5. The sportsbook room of claim 1 wherein each gaming terminal is also used to view a live sports competition.

6. The sportsbook room of claim 1 wherein each gaming terminal is used to view sports scores.

7. The sportsbook room of claim 1 wherein each gaming terminal is used to view sports statistics.

8. The sportsbook room of claim 1 wherein each gaming terminal is used to view betting odds on sports.

9. The sportsbook room of claim 1 wherein each gaming terminal is used to view house rules.

10. A sportsbook room comprising:

a plurality of television screens mounted on three adjacent walls of a casino room;

a plurality of carrels located in an area of the room from where the television screens may be viewed and around which the television screens form a semi-circle; and a plurality of gaming terminals, each gaming terminal located in one of the carrels;

wherein each gaming terminal includes at least one input device and at least one display device that are configured to operate with the gaming terminal to:

(a) enable a player to place a wager on a sports competition, the sports competition being a live event undetermined by a computer system; and (b) enable a player to play a casino game, wherein the casino game is a type of game different from wagering on a live sports competition.

11. The sportsbook room of claim 10 wherein each gaming terminal has an interactive touch screen.

12. A method of running a casino sportsbook comprising the steps of:

providing a sportsbook room in a casino comprising:

a plurality of television screens on at least one wall of a room, each television screen showing a live sports competition;

a plurality of carrels located in an area of the room from where the television screens may be viewed;

a plurality of interactive touch screen gaming terminals, each gaming terminal located in one of the carrels;

placing wagers by individuals in the sportsbook room using the gaming terminals in the carrels, the wagers on a live sports competition undetermined by a computer system; and accepting the wagers by the casino;

wherein each gaming terminal allows the individual to play casino games, wherein the casino games are types of games different from wagering on a live sports competition.

13. The method of claim 12 further comprising the step of providing at least one casino game by the casino on the gaming terminals, wherein the casino game is at least one of poker, blackjack, bingo, roulette, craps, or any combination thereof.

14. method of claim 12 further comprising the step of providing scores of sports competitions by the casino on the gaming terminals.

15. The method of claim 12 further comprising the step of providing betting odds on various sports by the casino on the gaming terminals.

16. The method of claim 12 further comprising the step of providing sports statistics by the casino on the gaming terminals.

17. The method of claim 12 further comprising the step of providing house rules and betting instructions by the casino on the gaming terminals.

18. The method of claim 12 further comprising the step of showing a sports competition of the individual's choosing on the gaming terminal.

19. The method of claim 12 further comprising the step of issuing payouts on winning wagers from the gaming terminals.

* * * * *